United States Patent
Yüksel et al.

(10) Patent No.: US 12,346,131 B2
(45) Date of Patent: Jul. 1, 2025

(54) METHOD OF CONTROLLING A TRANSITION AIRCRAFT AND TRANSITION AIRCRAFT

(71) Applicant: Volocopter GmbH, Bruchsal (DE)

(72) Inventors: Burak Yüksel, Tübingen (DE); Ashwath Ramesh, Ottobrunn (DE); Lucas Duarte, Munich (DE)

(73) Assignee: Volocopter GmbH, Bruchsal (DE)

( * ) Notice: Subject to any disclaimer, the term of this patent is extended or adjusted under 35 U.S.C. 154(b) by 154 days.

(21) Appl. No.: 18/229,205

(22) Filed: Aug. 2, 2023

(65) Prior Publication Data

US 2024/0045448 A1 Feb. 8, 2024

(30) Foreign Application Priority Data

Aug. 5, 2022 (EP) ..................................... 22189087

(51) Int. Cl.
*G05D 1/00* (2024.01)
*G06F 17/16* (2006.01)

(52) U.S. Cl.
CPC ........... *G05D 1/102* (2013.01); *G05D 1/0088* (2013.01); *G06F 17/16* (2013.01)

(58) Field of Classification Search
CPC ....... B64C 27/30; B64C 27/605; B64C 13/16; B64C 11/28; B64C 31/032; B64C 27/473; B64D 31/06; B64D 33/08; B64D 27/357; B63H 5/125; B64U 10/20; G05D 1/0808; G05D 1/0094; G05D 1/0669; H04W 4/44

See application file for complete search history.

(56) References Cited

U.S. PATENT DOCUMENTS

| 5,839,691 A * | 11/1998 | Lariviere | B64C 27/605 |
| | | | 244/17.23 |
| 6,286,783 B1 * | 9/2001 | Kuenkler | B63H 5/125 |
| | | | 244/30 |
| 10,752,372 B2 * | 8/2020 | Senkel | B64C 27/473 |

(Continued)

FOREIGN PATENT DOCUMENTS

| EP | 3832424 | 7/2022 |
| EP | 3757004 | 3/2023 |

(Continued)

*Primary Examiner* — Yuri Kan
(74) *Attorney, Agent, or Firm* — FIG 1 Patents

(57) ABSTRACT

A method of controlling a transition aircraft having actuators and which transitions between a first take-off/landing regime and a second horizontal flight regime, including: controlling a first actuator subset in the first regime and a second actuator subset in the second regime using the flight controller, by: a) providing measurements or estimates of flight parameters; b) depending on a current regime, checking whether a predefined set of conditions for that regime are fulfilled, by comparing flight parameters with threshold values; c) if conditions are fulfilled, signalling a decision-maker and awaiting confirmation regarding a transition to the other regime; d) instructing the flight controller to make the transition if approved; e) after transitioning in step d), commanding the aircraft according to the other regime; and f) returning to step a). Step e) includes gradually blending in a control law for the other regime over time while blending out the current regime.

20 Claims, 6 Drawing Sheets

(56) References Cited

U.S. PATENT DOCUMENTS

| | | | | |
|---|---|---|---|---|
| 11,610,496 | B2* | 3/2023 | Gong | H04W 4/44 |
| 12,109,911 | B2* | 10/2024 | Zagrodnik | B64D 27/357 |
| 2002/0022909 | A1* | 2/2002 | Karem | G05D 1/0094 |
| | | | | 701/3 |
| 2006/0231675 | A1* | 10/2006 | Bostan | B64U 10/20 |
| | | | | 244/12.1 |
| 2011/0163198 | A1* | 7/2011 | Leaver | B64C 31/032 |
| | | | | 244/12.1 |
| 2018/0265191 | A1* | 9/2018 | Sakuma | G05D 1/0808 |
| 2020/0097027 | A1* | 3/2020 | Su | G05D 1/0669 |
| 2020/0331601 | A1* | 10/2020 | Sabie | B64U 10/20 |
| 2021/0163144 | A1* | 6/2021 | Yuksel | B64D 31/06 |
| 2021/0253231 | A1* | 8/2021 | Ensslin | B64C 11/28 |
| 2021/0303004 | A1* | 9/2021 | Yüksel | B64C 13/16 |
| 2022/0402402 | A1* | 12/2022 | Zagrodnik | B64D 33/08 |

FOREIGN PATENT DOCUMENTS

| | | |
|---|---|---|
| ES | 2259325 | 10/2006 |
| ES | 2359325 | 5/2011 |

* cited by examiner

| Function | Equations/Transfer Functions |
|---|---|
| Single Pole Low Pass Filter | $G(s) = \dfrac{\omega}{s + \omega}$ |
| Double Pole Low Pass Filter | $G(s) = \dfrac{\omega^2}{s^2 + 2\zeta\omega s + \omega^2}$ |
| 2$^{nd}$ order Low Pass Butterworth Filter | $G(s) = \dfrac{G_0 \omega}{s^2 + 1.414\omega s + \omega^2}, G_0 = DCGain$ |
| Algebraic Functions | $f(x) = \dfrac{x}{(1 + |x|^k)^{1/k}}$ |
| Hyperbolic Tangent Functions | $f(x) = \tanh x$ |
| ArcTangent Functions | $f(x) = \arctan x$ |
| Logistic Functions | $f(x) = (1 + e^{-x})^{-\alpha}, \alpha > 0$ |

Fig. 6

METHOD OF CONTROLLING A TRANSITION AIRCRAFT AND TRANSITION AIRCRAFT

CROSS-REFERENCE TO RELATED APPLICATIONS

This application claims priority from European Patent Application No. 22189087.4, filed Aug. 5, 2022, which is incorporated herein by reference as if fully set forth.

TECHNICAL FIELD

The present invention relates to a method of controlling a transition aircraft, in particular an electrically powered vertical take-off and landing aircraft, i.e., an eVTOL, which aircraft comprises a plurality of actuators and which aircraft is able to transition between a first regime for take-off and landing and a second regime for horizontal flight.

The present invention further relates to a transition aircraft, in particular an electrically powered vertical take-off and landing aircraft, i.e., an eVTOL, which aircraft comprises a plurality of actuators and which aircraft is able to transition between a first regime for vertical take-off and landing and a second regime for horizontal flight.

BACKGROUND

Due to their vertical take-off and landing capability and their capability for long distance flights, VTOLs with transitioning capabilities (VTOL to aeroplane/fixed wing, and vice versa) will dominate our mobility in the coming years. Handling of the transition between these two regimes (hereinafter called "VTOL" and "Aeroplane") plays a significant role in safe and comfortable flight. The present invention proposes a simple and effective way to achieve this.

In the context is the present description, said first regime for vertical take-off and landing refers to a VTOL state or mode, which mode is managed by lifters and pushers and occurs while certain conditions are fulfilled. Such conditions are described in exemplary fashion in connection with FIG. 4.

Said second regime for horizontal flight refers to an aeroplane state/mode, which mode is managed by control surfaces and pushers and occurs while certain conditions are fulfilled. Such conditions are also described in exemplary fashion in connection with FIG. 4.

It should be noted that the aircraft is capable of horizontal flight without being in said aeroplane state/mode. Thus, horizontal flight can, in principle, occur in both said regimes, although in the context of the invention, said second regime is the more suited for long-range horizontal flight.

ES 2 259 325 A1 discloses a helicopter that can also operate according to an airplane mode. For example, the aircraft can take off in helicopter mode, and operate in this mode for low airspeed values. For higher speeds, a transition to an autogiro mode occurs, and for even higher speeds it is transitioned to airplane mode. In this way, transition between modes is governed by a current airspeed value alone, which is not enough in order to achieve safe and smooth transitions.

SUMMARY

It is the object of the invention to provide a method and an airplane, respectively, of the above-mentioned type which can handle transitions between different regimes (also referred to as "states" or "modes" in the present application) in a way that is safe, simple and effective at the same time.

The object is achieved by a method having one or more of the features described herein and by an aircraft having one or more of the features described herein.

Advantageous further embodiments of the invention are defined below and in the claims.

According to a first aspect of the invention, a method of controlling a transition aircraft, in particular an electrically powered vertical take-off and landing aircraft, eVTOL, which aircraft comprises a plurality of actuators and which aircraft is able to transition between a first regime for take-off and landing ("VTOL") and a second regime for horizontal flight ("Aeroplane"), which method comprises controlling a first subset of actuators from said plurality of actuators in said first regime and a second subset of actuators from said plurality of actuators in said second regime, and which method uses a state machine that is implemented by means of at least one flight control computer, comprises at least the following steps:

a) providing, to said flight control computer, measurements or estimates of a number of flight parameters, which flight parameters preferably comprise a current airspeed and of a current attitude of the aircraft;

b) depending on a current regime from said first and second regimes, checking by means of said state machine whether a respective predefined set of conditions in connection with said current regime are fulfilled, which conditions are based on a comparison of said flight parameters, preferably of measurements or estimates of a current airspeed and of a current attitude of the aircraft, respectively, with a respective predefined threshold value;

c) in case all of the conditions in said predefined set of conditions are fulfilled, signalling a corresponding state of the aircraft to a high-level decision maker and waiting for confirmation regarding a transition from said regime to the other one of said first and second regimes from said high-level decision maker;

d) instructing said flight control computer to make said transition from said current regime to said other one of said first and second regimes if said high-level decision maker has approved the transition;

e) after making the transition in step d), commanding the aircraft according to said other one of said first and second regimes in accordance with a regime-dependent control law implemented on said flight control computer;

f) returning to step a);

wherein said step e) comprises gradually blending in a control law for said other one of said first and second regimes over time while blending out a control law for said current regime over time.

Preferably, a time of blending in and time of blending out can differ, wherein typically blending-in is faster, i.e., requires less time than blending-out. This will be explained in more detail below.

Gradually blending in and out said control laws, respectively, is an important feature, since blending in means that the actuators/control of the next mode become(s) effective while blending out means that the actuators/control of the current mode gradually fade out. If blending-in time is longer than blending-out time (blending in is slower), then there can exist a deadtime where there is no control at all (if the current mode died out before the new mode kicked in), which can be disadvantageous.

If blending-in time equals blending-out time (both are exactly the same), then an undefined situation can occur if there are computation problems.

However, if blending-in time is shorter than blending-out time (blending in is faster), then one can ensure that said times and the corresponding control regimes overlap at least a bit such that there is no deadtime, and there is always sufficient control.

According to a second aspect of the invention, a transition aircraft, in particular an electrically powered vertical take-off and landing aircraft, eVTOL, which aircraft comprises a plurality of actuators and which aircraft is able to transition between a first regime for take-off and landing and a second regime for horizontal flight, comprises at least one flight control computer, which flight control computer is adapted to carry out the method according to said first aspect of the invention.

Thus, in order to overcome the disadvantages of the prior art, it is proposed to handle "VTOL" to "Aeroplane" and "Aeroplane" to "VTOL" transitions, in particular for eVTOL aircraft but applicable also for other aircraft with different energy types, in said at least one flight control computer by including a high-level decision maker to be in the loop and to make the final call in order to perform a transition. Said flight control computer monitors and detects the conditions for transition, which corresponds to establishing a current state of the aircraft by means of the state machine, which state is then used to inform the high-level decision maker accordingly (which is hereinafter also referred to as "pull"). The high-level decision maker (which can be either human or an autopilot or an artificial intelligence) then evaluates this information and allows or rejects the transition (which is hereinafter also referred to as "push").

Preferably, said at least one flight control computer can use a variety of information relevant to flight, especially airspeed and attitude. Combining this information with a control demand (which is regularly already computed in the flight control computer), one can efficiently detect the conditions for transition.

The transition between regimes itself is safely handled by gradually blending in a control law for said other one of said first and second regimes and, at the same time, blending out a control law for said current regime over time, in particular during the actual control allocation, e.g., by changing the "weight" of the allocated actuators in the underlying control allocation problem. This prevents potentially harmful and uncomfortable abrupt transitions.

For illustration purposes, reference is hereinafter made to a transitioning VTOL aircraft of the type described in EP 3 757 004 A1, as produced by the applicant. However, the invention is not limited to such an aircraft.

The exemplary aircraft depicted in FIG. 1 has a plurality of actuators, namely 6 (six) lifters or lifting units, 2 (two) pushers or forward propulsion units and 6 (six) control surfaces (two ailerons in the front, two elevators on the back and two rudders on the V-tail). FIG. 1 shows, in various different views, the respective locations of the actuators 2, 3, 4a-4c. In FIG. 1, reference numeral 1 denotes the entire aircraft described in EP 3 757 004 A1, reference numeral 2 denotes the lifters, reference numeral 3 denotes the pushers, and reference numerals 4a to 4c denote the ailerons, the elevators and the rudders, respectively.

Lifters 2 can be devised as upward facing motors with open rotors. Pushers 3 can be devised as forward-facing motors with ducted fans. Control surfaces 4a-4c are generally devised as surface parts that are movable in a controlled way.

The lifters 2 are used to generate lift and control in the VTOL (vertical take-off and landing) phase or regime. In this phase, said control surfaces 4a-4c are not used. Furthermore, in this phase the pushers 3 can be used to help achieve yaw/heading control.

The pushers 3 are used to generate forward thrust for forward acceleration and yaw/heading controllability. Said pushers 3 bring the aircraft 1 to the speeds at which it can make a transition to the aeroplane phase or regime.

The control surfaces 4a-4c are used to generate controllability and maneuverability in the aeroplane phase. In this phase, the pushers 3 can still be used for generating forward thrust and for providing yaw/heading controllability. In this phase, the lifters 2 are not used.

Hereinafter, said two phases or regimes are also referred to as "first regime" and "second regime", respectively, wherein any one of said regimes can be said "first regime", while the other one then is said "second regime".

In the light of said information, it becomes clear that different actuators (subsets of actuators) are controlled in different flight phases. For example, in perfect hover (which is depicted in FIG. 2), the total vertical collective forces generated by the lifters 2 is equal to the weight of the aircraft 1, i.e., $f_l=mg$, and since it is perfect hover and hence airspeed is zero, there is no aerodynamic lift ($f_a=0$). Aircraft 1 is airborne owing to the lifters 2, and the control surfaces 4a-4c (cf. FIG. 1) are of no use and hence they are not activated.

On the other hand, when flying above a certain airspeed (cf. FIG. 3), the total aerodynamic lift forces can balance out the weight of the aircraft 1, i.e., $f_a=mg$. In this case, the lifters 2 are of no use, hence they are not used. Control surfaces 4a-4c (cf. FIG. 1) are active for providing controllability and maneuverability. Pushers 3 are active as well, as mentioned above ($f_p \neq 0$).

In FIGS. 2 and 3, $f_l$ stands for the total vertical collective forces generated by the lifters 2, $f_a$ stands for the total aerodynamic lift forces, $f_p$ stands for the total forward thrust forces generated by the pushers 3, m is the mass of the aircraft 1 and g is the gravitational constant.

The method according to the present invention, which shall be explained further in the following, allows to handle the transition between these two modes and hence the change of using different actuators, i.e., lifters versus control surfaces, in said modes in a safe and graceful way. The pushers have been excluded here since they can advantageously be active in both modes.

In the context of the invention, all important computations regarding managing the transition from "VTOL" to "Aeroplane" regime and vice versa are performed inside the flight control computer which comprises the required hardware and/or software (firmware).

According to the invention, an instance referred to as "High Level (HL) Decision Maker" has the final saying for enabling the transition. Said HL Decision Maker can—optionally—overwrite the conditions for transition (although said conditions or a monitoring thereof may trigger an indication, e.g., to a human pilot, to help make the correct decision). In this case, HL Decision Maker uses so called "waiver", ignores any potential warnings Indications) and takes full responsibility to make a transition, even though the flight control computer, as proposed, does not detect enough conditions satisfied for transitioning from Aeroplane to VTOL or vice versa. In piloted aircraft this can be useful depending on requirements from the safety authorities. For example, in a situation when an airspeed information might be unreliable, it can be left to the pilot to take the final decision.

"Overwrite the conditions" means that the HL Decision Maker's decision is taken as the final say. If, for example, the flight control computer does not detect enough conditions satisfied for transitioning from Aeroplane to VTOL, or vice versa, HL Decision Maker can overwrite this, meaning that (s)he can ignore this fact and still make a transition to VTOL (or Aeroplane). This option can be advantageous depending on a current situation.

In another option, this possibility is not given to the HL Decision Maker. In this way, full trust is placed into a flight control architecture (which in standard aviation practice is designed according to very high safety standards, such that its failure probability is at minimum equivalent to, i.e., as low as a failure probability of the entire aircraft, which is typically as low as $10^{-9}$ fatal accidents per flight hour. Hence, an appropriate design choice for said flight control architecture assures that its failure is very improbable—almost equivalent to zero, e.g., as low as $10^{-9}$, $10^{-10}$ or even less). According to this option, the HL Decision maker cannot overwrite the conditions for transition: if they are not fulfilled, HL Decision Maker is not given the option to transition for safety reasons. However, a corresponding indication may still be there.

A more detailed description of an embodiment according to the present invention is provided below:

First of all, we consider that the whole system, i.e., the aircraft is healthy enough to go to airborne, either in regime VTOL or in regime Aeroplane. Due to the nature of the aircraft, it generally starts in the VTOL mode.

Airspeed measurements $v_a$ and aircraft attitude measurements q are assumed to be provided (either directly measured or estimated using any known method). Airspeed can be obtained using any known means, such as a pitot tube or a differential pressure estimation. It is preferred to make use of true air speed or calibrated air speed, however indicated airspeed can also be used. In case of attitude measurements, one can make use of the information from various sensors or accelerometers or gyroscopes of an inertial measurement unit (IMU) and fuse them all.

Considering the VTOL state or regime, preferably four conditions (C#) are checked:

C1: Is aircraft attitude acceptable for a transition to Aeroplane? This condition is checked by looking at the aircraft attitude q and by comparing it with predefined thresholds, which thresholds can be defined based on simulations and flight test data. This is to avoid transition while doing excessive manoeuvres (for comfort and safety).

Typical threshold values may be, without limitation, between −5 degrees and +5 degrees for either roll or pitch, and between −5 degrees/s and +5 degrees/s for the yaw rate. This corresponds to an (almost) level flight and without too much change of heading.

C2: Is aircraft airspeed acceptable for a transition to Aeroplane? This condition is checked by looking at the aircraft airspeed $v_a$ and by comparing it with a predefined threshold, $v_{a,threshold,ToAero}$. In general, airspeed shall be greater than a predefined threshold for it to be acceptable (i.e., $v_a > v_{a,threshold,ToAero}$). This threshold will preferably be defined based on stall speed and other performance parameters of the aircraft, such as energy consumption, time required for transition, etc.

In this context, one is basically looking for relatively low lift forces demanded to the lifters. The theoretical value is 0, but in practice values corresponding to 10 or 20% of the aircraft weight may be acceptable.

C3: Is the total collective force of the lifters, $f_l$, acceptable for a transition to Aeroplane? This condition is checked by looking at the computed demand forces as output of the flight control laws, which run on the flight control computer, and by comparing it with a predefined threshold defined based on simulations and flight test data. Typically, $f_l$ shall be smaller than a predefined threshold, $f_{l,threshold,ToAero}$, for it to be acceptable (i.e., $f_l < f_{l,threshold,ToAero}$).

C4: Are there enough healthy actuators in the aeroplane phase to maintain stable flight after transition? This includes health checks at least for all actuators that are used for aeroplane flight. For the exemplary case of the aircraft described in EP 3 757 004 A1 these actuators comprise said 6 control surfaces and said 2 pushers. The controllability and manoeuvrability in the aeroplane phase mainly rely on the pushers for forward thrust. In this check, the health of pushers may thus have a higher priority than the health of the control surfaces.

When all conditions (C1, C2, C3 and C4) return True (meaning they all are accomplished), this may advantageously be indicated to logging systems, warning systems, indication systems, human pilot if onboard, onboard autopilot systems (if such systems exist), ground-based systems via telemetry and/or all other relevant systems, implying that AIRCRAFT IS READY TO TRANSITION FROM VTOL TO AEROPLANE. This is when said "pull" has happened. If not, C1, C2, C3 and C4 can be continuously monitored.

When all conditions (C1, C2, C3 and C4) return True (meaning they all are accomplished), then the flight control computer waits for confirmation from said high-level decision maker (HL Decision Maker). In manned flights, this can be the human pilot onboard. In automated unmanned flights, this can be a human operator on ground. In autonomous flights, this can be an onboard or an on-ground autonomy system.

If there is an onboard human pilot, said pilot preferably receives the corresponding information via an indication, which indication states that the aircraft is ready for transition. Indication can be provided visually via LEDs or other displays, as well as via audible cues. Then the pilot may allow the transition via switch(es), button(s) or other means of interfaces that can be connected to the flight control computer via electric wires. Otherwise, the pilot may reject the transition (which may prevent an erroneous activation of the transition).

In the case of an automated unmanned flight and in the case of a ground-based operator, said operator receives the information via preferably wireless communication and allows transition via switch(es), button(s) or other means or interfaces. Otherwise, the operator may reject the transition (which may prevent an erroneous activation of the transition). The decision of the operator is then transmitted back to the flight control computer via suitable (wireless) communication.

In case of autonomous flights, the onboard or on-ground AI (artificial intelligence unit) receives the indication message from the flight control computer either via electric wires (using, e.g., serial/ARINC/CAN/PWM or other forms of communication) or via wireless communication (radio or LTE etc.). Then, preferably by using different types of sensors (e.g., LIDAR, GPS/GNSS or a camera) and related models, AI either allows the transition or rejects it. The decision of AI is transmitted back to flight control computer via electric wires or wireless communication.

In this context, "model" is meant in the scope of machine learning, i.e., a model whose inputs are the aforementioned sensor information and whose output is said decision of transitioning from VTOL to Aeroplane, and vice versa.

The model can be trained, together with a human pilot, in extensive simulations and flight tests to provide both supervised and unsupervised learning, which can also be based on available previous flight data, sensor information etc.

If HL decision maker has approved the transition ("push"), then—in the present example—flight control computer performs a transition to the Aeroplane state, hence commanding the aircraft to make transition to the aeroplane mode.

In this case, a corresponding control blending is performed first, which will be explained in detail below.

After transition, the following conditions are checked in Aeroplane mode:

C5: Is aircraft attitude acceptable for a transition to VTOL? This condition is checked by looking at the aircraft attitude q and comparing it with predefined thresholds defined based on simulations and flight test data. This is to avoid transition while doing excessive manoeuvres (for comfort and safety) (cf. above for typical values).

C6: Is aircraft airspeed acceptable for a transition to VTOL? This condition is checked by looking at the aircraft airspeed V a and comparing it with a predefined threshold. The airspeed shall be smaller than a predefined threshold for it to be acceptable ($v_a < v_{a,threshold,ToVTOL}$). This threshold can again be defined based on stall speed and transition performance parameters, such as energy consumption or time required for transition etc.

C7: Is the total collective force of the lifters, $f_l$, acceptable for a transition to VTOL? This condition is checked by looking at the computed demand forces as output by the flight control laws, which run on the flight control computer, and by comparing it with a predefined threshold defined based on simulations and flight test data. In general, $f_l$ shall be greater than a predefined threshold for it to be acceptable ($f_l > f_{l,threshold,ToVTOL}$).

C8: Are there enough healthy actuators in the VTOL phase to maintain stable flight after the transition? This includes health checks for all actuators that are necessary for performing the VTOL phase (for the exemplary aircraft under consideration, this comprises the 6 lifter motors, but not necessarily the pushers, since VTOL flight can be performed without pushers, although they are used in the VTOL regime, too, in order to improve flight performance and enhance control behaviour). However, the VTOL phase does not rely on the pushers for stable flight if all the 6 lifters are healthy.

When all conditions (C5, C6, C7 and C8) return True (meaning they all are accomplished), this may be indicated to logging systems, warning systems, indication systems, a human pilot (if onboard), onboard autopilot systems (if such systems exist), ground-based systems via telemetry, and to all other relevant systems implying that AIRCRAFT IS READY TO MAKE TRANSITION FROM AEROPLANE TO VTOL. This is when the above-defined "pull" has happened. If not, conditions C5, C6, C7 and C8 can be continuously monitored and analysed.

When all conditions (C5, C6, C7 and C8) return True (meaning they all are accomplished), then flight control computer waits for the confirmation from HL Decision Maker. In manned flights, this can be the human pilot onboard. In automated unmanned flights, this can be the human operator on the ground. In autonomous flights, this can be the autonomy system onboard or on the ground.

If there is an onboard human pilot, said pilot receives the corresponding information via indication, which indication states that the aircraft is ready for transition. Indication can be provided visually via LEDs or other displays, as well as via audible cues. Then the pilot may allow the transition via switch(es), button(s) or other means of interfaces that can be connected to the flight control computer via electric wires. Otherwise, the pilot may reject the transition (which may prevent an erroneous activation of the transition).

In the case of an automated unmanned flight and in the case of a ground-based operator, said operator receives the information via preferably wireless communication and allows transition via switch(es), button(s) or other means or interfaces. Otherwise, the operator may reject the transition (which may prevent an erroneous activation of the transition). The decision of the operator is then transmitted back to the flight control computer via suitable (wireless) communication.

In case of autonomous flights, the onboard or on-ground AI (artificial intelligence unit) receives the indication message from the flight control computer either via electric wires (using, e.g., serial/ARINC/CAN/PWM or other forms of communication) or via wireless communication (radio or LTE etc.). Then, preferably by using different types of sensors (e.g., LIDAR, GPS/GNSS or a camera) and related models, AI either allows the transition or rejects it. The decision of AI is transmitted back to flight control computer via electric wires or wireless communication.

If HL decision maker has approved the transition ("push"), then—in the present example—flight control computer performs a transition to the VTOL state, hence commanding the aircraft to make transition to the VTOL mode.

In this case, too, a corresponding control blending is performed first, which will be explained in detail below.

Then the cycle preferably repeats itself between VTOL and Aeroplane regimes (if required) until the aircraft has landed and the corresponding mission is completed.

Advantageously, when transitioning between VTOL and Aeroplane modes, owing to the well-defined checks C1, C2, C3, C4, C5, C6, C7 and C8 described above, the physical and environmental conditions or a corresponding state of and around the aircraft is/are generally favourable for both the VTOL and the Aeroplane mode. For this reason, said transition will be smooth and comfortable as it occurs in a moment where the aircraft could fly in both VTOL and Aeroplane mode, respectively.

Owing to the definition of these conditions, certain delays from the pilot on allowing the transition are acceptable. In particular, from VTOL to Aeroplane mode, an infinite time of delay can be acceptable; from Aeroplane to VTOL mode, several seconds of delay can be acceptable, which particularly depends on the definition of condition C6.

Due to the fact that the above-mentioned observations and checks are performed on different sensor measurements and any computations involved are preferably made entirely by the flight control computer(s) that control the aircraft itself, the method presented here is robust against malfunctions and erroneous detections. Finally, due to leaving the final decision to a high-level decision maker (push principle), especially in case of flights piloted by an onboard human pilot, the method is robust against erroneous activations.

As stated above, the method according to the invention comprises gradually blending in a control law for said other one of said first and second regimes and blending out a control law for said current regime over time. This will now to be explained in more detail.

A desired motion of the aircraft is achieved by mathematically calculating the forces and moments to be applied on the aircraft and then allocating the available actuators in such a way that these desired forces and moments are achieved. The flight control laws mentioned earlier are used by the flight control computer to compute the desired forces ($X_{des}$, $Y_{des}$, $Z_{des}$) and moments ($L_{des}$, $M_{des}$, $N_{des}$). This yields a desired pseudo control which is grouped into a vector $v_{des} \in \mathbb{R}^n$. The allocation of actuator control inputs $u \in \mathbb{R}^m$ to achieve the desired pseudo control $v_{des}$ is known as the control allocation problem. Mathematically, the control allocation problem involves solving Equation 1 for finding u.

$$v_{des_{n \times 1}} = B_{n \times m} \cdot u_{m \times 1}. \quad (\text{Eq. 1})$$

The matrix $B \in \mathbb{R}^{n \times m}$ is called the control effectiveness matrix and contains the information on how effective each actuator is in the direction of the elements of $v_{des}$. One needs to solve the above equation for u by an inverse computation of the non-square B matrix in case $n \neq m$ (in fact, for the aircraft described in EP 3 757 004 A1 and for other aircraft produced by the applicant this is the case) and $m > n$. The classical way of doing this is given by $$u = B^\dagger(W_u, \bar{u}, \underline{u}) \cdot v_{des}, \quad (\text{Eq. 2})$$

where usually the inversion is done by considering a weight matrix $W_u \in \mathbb{R}^{m \times m}$, and the physical limits of each actuator, e.g., upper limits $\bar{u} \in \mathbb{R}^m$ and lower limits $\underline{u} \in \mathbb{R}^m$, respectively, where $\forall i=1, \ldots, m: \underline{u} \leq u_i \leq \bar{u}$.

Note: Let $M \in \mathbb{R}^{k \times p}$ denote a matrix with rank(M)=p. Then $M^\dagger$ denotes the left-hand pseudo-inverse such that $M^\dagger M = I$. Said inverse corresponds to the standard matrix inverse $M^\dagger = M^{-1}$ if k=p or to the pseudo-inverse $M^\dagger = M^T(M M^T)^{-1}$ if k>p.

The weighted pseudo inverse solution is mathematically represented as $$B^\dagger = W_u \cdot (B \cdot W_u)^\dagger. \quad (\text{Eq. 3})$$

In the case of the aircraft described in EP 3 757 004 A1, the actuator control input vector $u \in \mathbb{R}^{14 \times 1}$ comprises a total of 14 actuators. Physically, this corresponds to the rotation rates of the 6 lifter rotors ($\omega=[\omega_1 \ldots \omega_6]$), the rotation rates of the 2 pusher fans ($\omega=[\omega_7, \omega_8]$), and to the deflections of a pair of ailerons ($\xi=[\xi_L, \xi_R]$), a pair of elevators ($\eta=[\eta_L, \eta_R]$) and pair of rudders ($\zeta=[\zeta_L, \zeta_R]$), respectively. The mapping of these actuators to the desired pseudo controls is shown in FIG. 5.

With the above control allocation solution, one can achieve the desired forces and moments required to control the aircraft in different phases using the control authority of the actuators. However, when switching between the VTOL regime and the Aeroplane regime, the available (or suitable) actuators are different, as explained earlier, hence arises a need to safely and smoothly blend in the active actuators and to blend out the inactive actuators for solving the control allocation problem during and after transition. To achieve such smooth transition between the VTOL regime and the Aeroplane regime, the actuators can be sorted into two groups (or subsets) of actuators, which shall be referred to as "the VTOL actuators" and "the Aeroplane actuators". Some actuators can be in both groups or in none of the groups, as explained below.

Note: The technique described below can be implemented for any configuration of transition aircraft, if the aircraft has two subsets of actuators used for implementing two flight states, a first flight state being VTOL and a second flight state being Aeroplane, and for other (generic) actuator systems other than aircraft, where a smooth transition between multiple sets of actuators is required.

By way of example, control blending for the aircraft described in EP 3 757 004 A1 will now be explained. The VTOL actuators of said aircraft comprise the 6 lifters and the Aeroplane actuators comprise of the 6 control surfaces. The 2 pushers (e.g., EDFs—electric ducted fans), which help in yaw/heading control and longitudinal acceleration in VTOL and Aeroplane phases, are not included in the above-mentioned two groups, since they remain active all the time in both the VTOL phase and the Aeroplane phase. The property of the weighting matrix in the weighted pseudo inverse of Equation 3 is used for activation and deactivation of the different actuators.

During the VTOL mode, only the VTOL actuators are used, and these actuators have weight 1 on the weight matrix $W_u$. The aeroplane actuator's weights are set to 0. This guarantees that these actuators are not used during this phase. For the exemplary aircraft, this corresponds to the control surfaces.

During Aeroplane mode, only the Aeroplane actuators are used, and these actuators have weight 1 on the matrix $W_u$. The VTOL actuator's weights are set to 0, and they are not used in this phase. For the exemplary aircraft, this corresponds to the 6 lifters.

For the pushers, the weights in the matrix $W_u$ are always set to 1 in both modes, since they are required in both phases of flight. For the exemplary aircraft, this corresponds to the pushers.

To make a safe and smooth transition between these two states, in an embodiment of the invention we propose a dynamic behaviour to gradually vary the actuators group weights between 0 and 1. A variety of filters, such as a single pole/double pole low pass filter, a Butterworth filter, etc. can be used to achieve the desired transition behaviour and speed. By using sigmoid functions, such as hyperbolic tangent functions, logistic functions, etc. it is possible to modify the behaviour of the weight dynamics at different phases of transition. Sigmoid functions not only help to achieve asymptotic behaviour for the dynamics, but also enable flexibility to modify smoothness and roll-off points of the dynamics.

"Roll-off", which is a term stemming from linear control theory/filter design theory, denotes the slope of a system's response in the transition region between its excited or active state (in filters this refers to the pass-band) and its inactive state (in filters this refers to the stop-band). If the response of the system changes rapidly with frequency, the roll-off is said to be steep.

In the context of the application, the aircraft may experience flutters, vibrations or alike during transition. By changing the filter characteristics that govern the transition behaviour, one can have control of such situations.

For example, a preferred custom sigmoid function, which is applicable for smooth transition between 0 and 1 using the hyperbolic tangent function, is given by Equation 4.

$$f(x) = 0.5 + 0.5 \tanh((x-a)/b). \quad (\text{Eq. 4})$$

By varying the values for a and b in Equation 4, it is possible to modify the intersection points of the weights of VTOL actuators and Aeroplane actuators during transition and also the overall smoothness of the transition.

The weight matrix $W_u$ is a diagonal matrix, which means that each element of the diagonal corresponds to the weight of one particular actuator. This allows to design the dynamic behaviour, speed and smoothness for the weights of each actuator and hence the transition behaviour of each individual actuator. This also provides flexibility to design different filters and sigmoid functions based on the state to which the transition is happening (VTOL to Aeroplane or Aeroplane to VTOL). For example, when fading in the VTOL actuators, it is better to activate them rather fast, while it is preferred to fade them out rather slowly. The precise behaviour over time can be modified based on a respective input from the state machine (e.g., "VTOL to Aeroplane transition activated" or "Aeroplane to VTOL transition activated", using Boolean (true/false) or binary systems (0/1) or enumerators with 0/1 or any other possible way) to the allocation algorithm.

The transition behaviour (filter and/or sigmoid function parameters) can be predefined for different scenarios and can be chosen based on the states that are communicated from the state machine to the control algorithms. Furthermore, they can also be dynamically varied during flight using different parametrizations (e.g., different gains/constants) based on various conditions, such as environmental conditions, aircraft health, pilot request, etc.

The best fit of filter type and parameters can be found in many ways, e.g., during a flight test campaign during which a human pilot switches between different filters. In another example based on increased attitude error, one can increase the gain of the filters and hence make them faster so that transition is quicker. However, the invention is by no means limited to these embodiments, as there are many different possible ways to achieve the same result.

In any case, the above-described precision and flexibility provide safety, robustness and smoothness during any transition phase of the flight. This flexibility can also be extended for achieving secondary objectives, such as minimum power consumption during transition, minimum time required for a transition, minimum physical loads during transition, etc., as disclosed in EP 3 832 424 A1, the content of which is herewith incorporated by reference.

The following further developments of the method according to the invention have proven particularly useful.

In a preferred embodiment, said flight parameters comprise at least one of: a current airspeed of the aircraft, a current attitude of the aircraft, a total collective force of lifting units comprised in the aircraft, a number of healthy actuators from said plurality of actuators, preferably with respect to one subset of said first and second subsets of actuators, which one subset corresponds to that one of said first and second regimes which is different from said current regime. This has been explained in detail above.

In another preferred embodiment, said actuators comprises lifting units, forward propulsion units and control surfaces, e.g., flaps, elevators, rudders or ailerons.

In yet another preferred embodiment, said high-level decision maker is at least one of: a pilot on board the aircraft, an operator on the ground, an on-board or on-ground artificial intelligence unit.

In still another preferred embodiment, said set of conditions comprises at least one of: an assessment of an attitude of the aircraft in relation to at least one corresponding attitude threshold value, an assessment of an airspeed of the aircraft in relation to at least one corresponding airspeed threshold value, an assessment of a total collective lifting force of the actuators in relation to at least one corresponding lifting force threshold value, an assessment of a number of healthy actuators in relation to a number of actuators from said plurality of actuators that are required to achieve stable flight in that one of said first and second regimes which is different from said current regime.

Preferably, in another embodiment, said transition is made at a moment in flight, in which moment the aircraft can achieve stable flight in both said first regime and said second regime. This makes the transition particularly safe and smooth.

In another preferred embodiment, said high-level decision maker is enabled to command said transition even in the absence of all of the conditions in said predefined set of conditions being fulfilled. This can be helpful in particular situations, as explained.

In yet another preferred embodiment, however, said high-level decision maker is forbidden to command said transition in the absence of all of the conditions in said predefined set of conditions being fulfilled.

In a highly advantageous embodiment, the flight control computer computes desired pseudo control commands, $v_{des} \in \mathbb{R}^n$, $n \in \mathbb{N}$, for the aircraft that are linked to actual actuator commands $u \in \mathbb{R}^m$, $m \in \mathbb{N}$, via $$v_{des_{n \times 1}} = B_{n \times m} \cdot u_{m \times 1},$$

where matrix $B \in \mathbb{R}^{n \times m}$ is the control effectiveness matrix which contains the information on how effective a given actuator is in the direction of the elements of $v_{des}$, and via $$u = B^\dagger(W_u, \bar{u}, \underline{u}) \cdot v_{des},$$

by considering a weight matrix $W_u \in \mathbb{R}^{m \times m}$, and the physical limits of each actuator, e.g., upper limits $\bar{u} \in \mathbb{R}^m$ and lower limits $\underline{u} \in \mathbb{R}^m$, respectively, where $\forall i=1, \ldots, m$: $\underline{u}_i \le u_i \le \bar{u}_i$, wherein said gradually blending in and out of control laws omprises modifying said weight matrix.

In the above-described context, during said first regime, preferably only the actuators from said first subset are used, and these actuators are assigned weight 1 on the weight matrix $W_u$, whereas actuators from said second subset are assigned weight 0, wherein preferably said second subset comprises control surfaces of the aircraft; and during said second regime, only the actuators from said second subset are used, and these actuators are assigned weight 1 on the weight matrix $W_u$, whereas actuators from said first subset are assigned weight 0, wherein preferably said first subset comprises lifting units of the aircraft; whereas preferably those weights in weight matrix $W_u$ that refer to forward propulsion units of the aircraft are always set to 1 in both regimes. In this way, the pushers can advantageously be used in both regimes.

In a preferred embodiment, the weights are dynamically switched or varied between 0 and 1 by using a mathematical filtering function, $f$, said function preferably being on of: a single pole low pass filter, a double pole low pass filter, a $2^{nd}$ order low pass Butterworth filter, an algebraic function, a sigmoid function, e.g., a hyperbolic tangent function, an arc tangent function or a logistic function; wherein most preferably said function is given by:

$$f(x) = 0.5 + 0.5 \tanh((x-a)/b),$$

with adaptable constant values a and b. In this way, various forms of control blending can be achieved.

For increased flexibility, in another preferred embodiment, different blending patterns are used for transitions from said first regime to said second regime, and vice versa, respectively, which preferably involves using different filtering functions, wherein most preferably the actuators from said first subset of actuators are blended in over a first time and blended out over a second time, said first time being shorter than said second time, wherein most preferably said blending patterns are modified based on input parameters provided by the state machine.

As stated earlier, blending-in is preferably done faster, i.e., in shorter time than blending-out, meaning that there is a noticeable difference between the time of blending-in and blending-out, respectively, wherein blending-in is typically quicker. In this way, one can advantageously ensure that there can be an amount of time during which the aircraft has no control input at all (e.g., blending-in for one subset of actuators has happened quicker than blending out of the other subset of actuators), meaning there is always a fully controlled aircraft during transition. Furthermore, one can ensure that there is an overlapping of both subsets of actuators, during which the aircraft is controlled by all of actuators for a while. Since the aircraft is preferably stable in both regimes during transition (as explained above) this does not lead to any problem in aircraft behaviour, since controllability of the aircraft is ensured.

In yet another preferred embodiment, blending patterns, e.g., a filtering function type and/or filtering function parameters, are predefined for different flight scenarios and are chosen based on states provided by the state machine to flight control algorithms of the flight control computer or are dynamically varied during flight using different respective parametrizations, e.g., different gains and/or constants, based on various detected or detectable conditions, such as environmental conditions, aircraft health, pilot request, etc. This increases flexibility even more.

In a highly advantageous embodiment, blending patterns, e.g., a filtering function type and/or filtering function parameters, are further adapted for to achieve at least one secondary objective, such as minimum power consumption during transition, minimum time for transition, minimum physical load during transition, etc.

BRIEF DESCRIPTION OF THE DRAWINGS

Further advantages and characteristics of the invention will now become apparent from the following description of preferred embodiments by means of the attached drawings.

FIG. 6 shows possible filtering functions which can be used in one embodiment of the method according to the invention;

DETAILED DESCRIPTION

Figure 1:
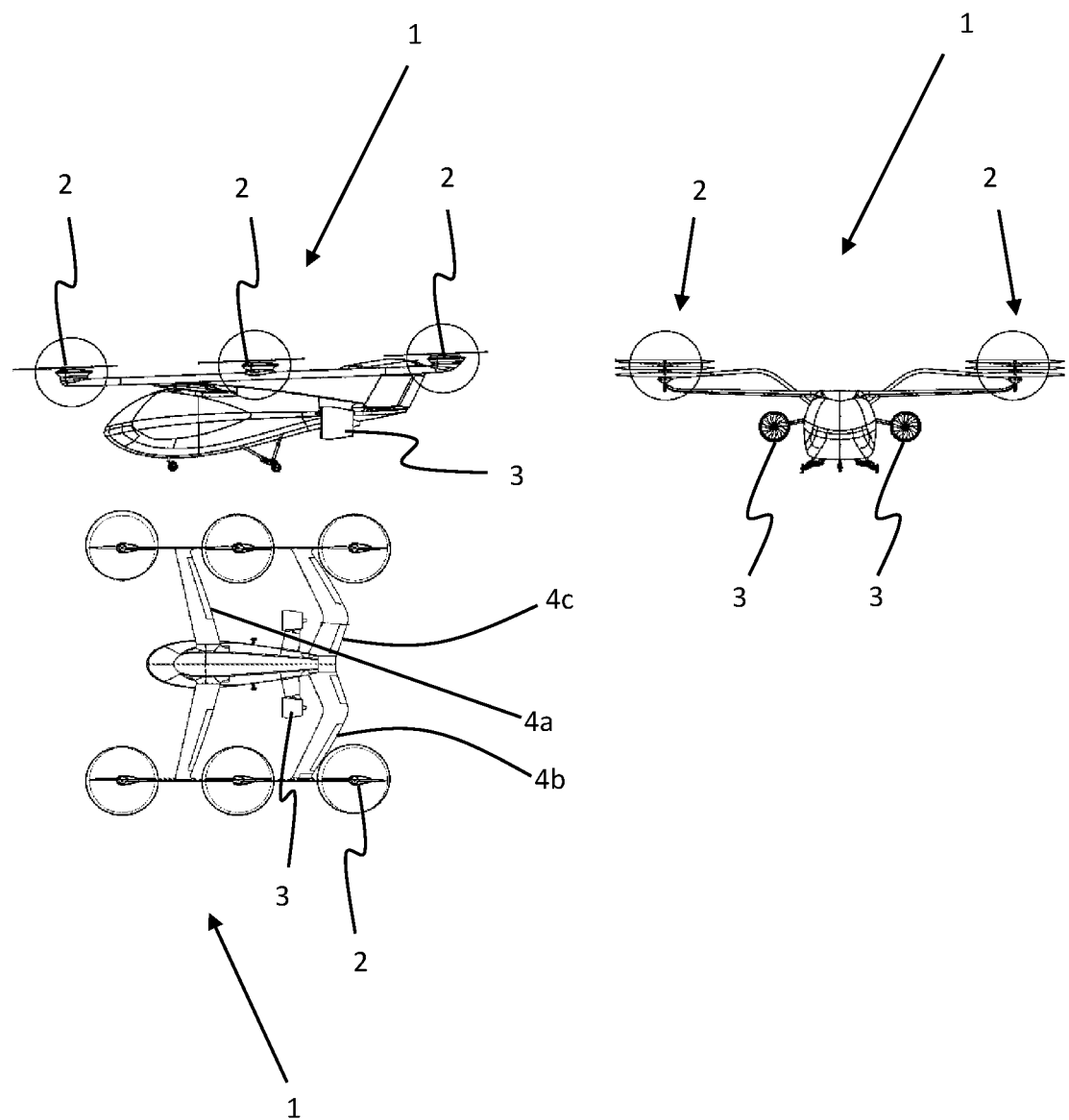
FIG. 1 shows various views of an aircraft according to the invention to illustrate a possible arrangement of the actuators.

In the figures, the same reference numerals indicate identical or at least identically functioning elements.

Figure 2:
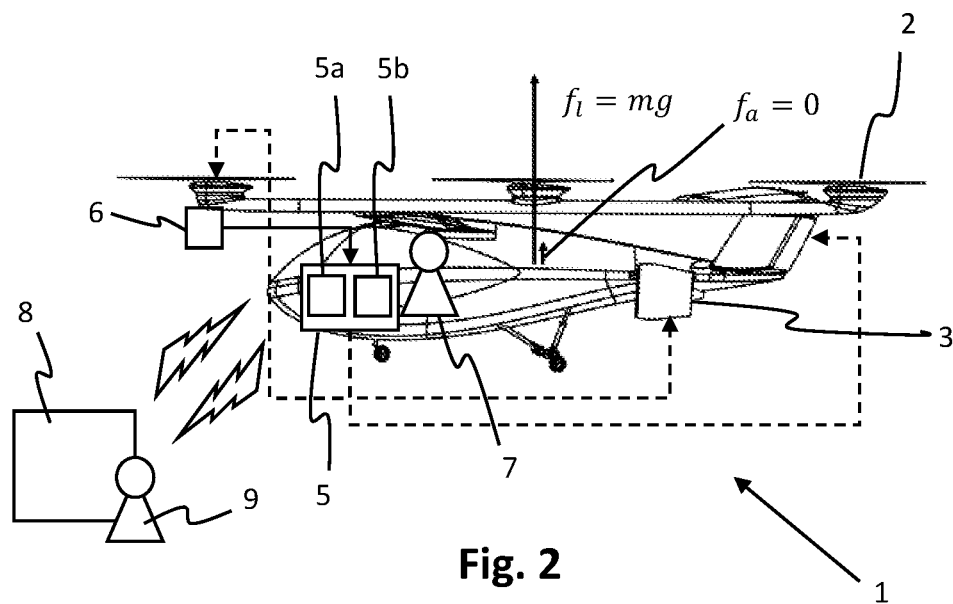
FIG. 2 shows a further representation of an aircraft according to the invention in a first flight condition.
Figure 3:
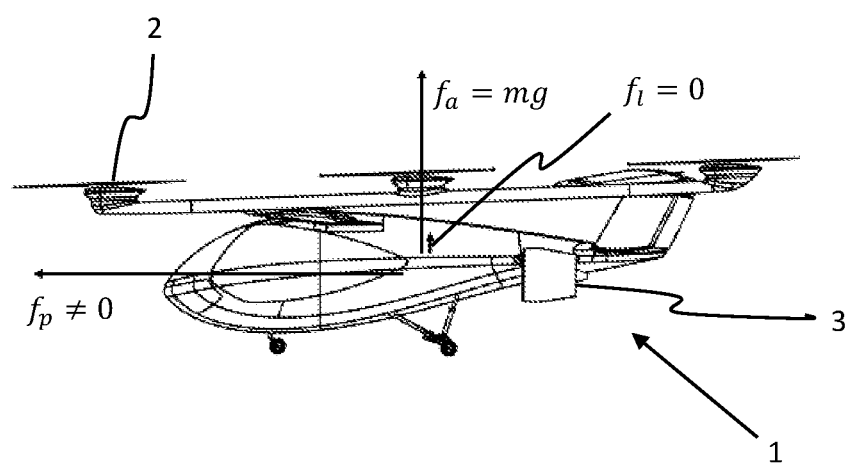
FIG. 3 shows the aircraft of FIG. 2 in a second flight condition.

FIGS. 1 to 3 have already been discussed in detail in the introductory part of the description; reference may be made to this for the time being in order to avoid repetition.

In FIG. 2, reference sign 5 additionally shows a flight control computer on board the aircraft 1, which interacts with at least one sensor 6 in terms of signalling technology, which sensor 6 supplies data concerning a current flight status of the aircraft 1. In practice, further such or different sensors will be present. Preferably, the sensors provide measured values concerning an airspeed and an attitude of the aircraft 1. Reference sign 7 symbolises a (human) pilot on board the aircraft 1. Reference sign 8 symbolises a ground station with human operator 9, which ground station 8 is in wireless radio communication with the aircraft 1 or the flight control computer 5, as schematically shown. The flight control computer 5 controls the lifting units 2 and the forward propulsion units 3, as shown; it comprises at least one state machine 5*a* and optionally a high-level decision maker 5*b*, as symbolically shown. Decisions of the state machine 5*a* or the high-level decision maker 5*b* are based, among other things, on the sensor measurements mentioned.

In FIG. 2, the control surfaces 4*a*-4*c* are not shown for reason of intelligibility; they are also controlled by means of flight control computer 5.

Figure 4:
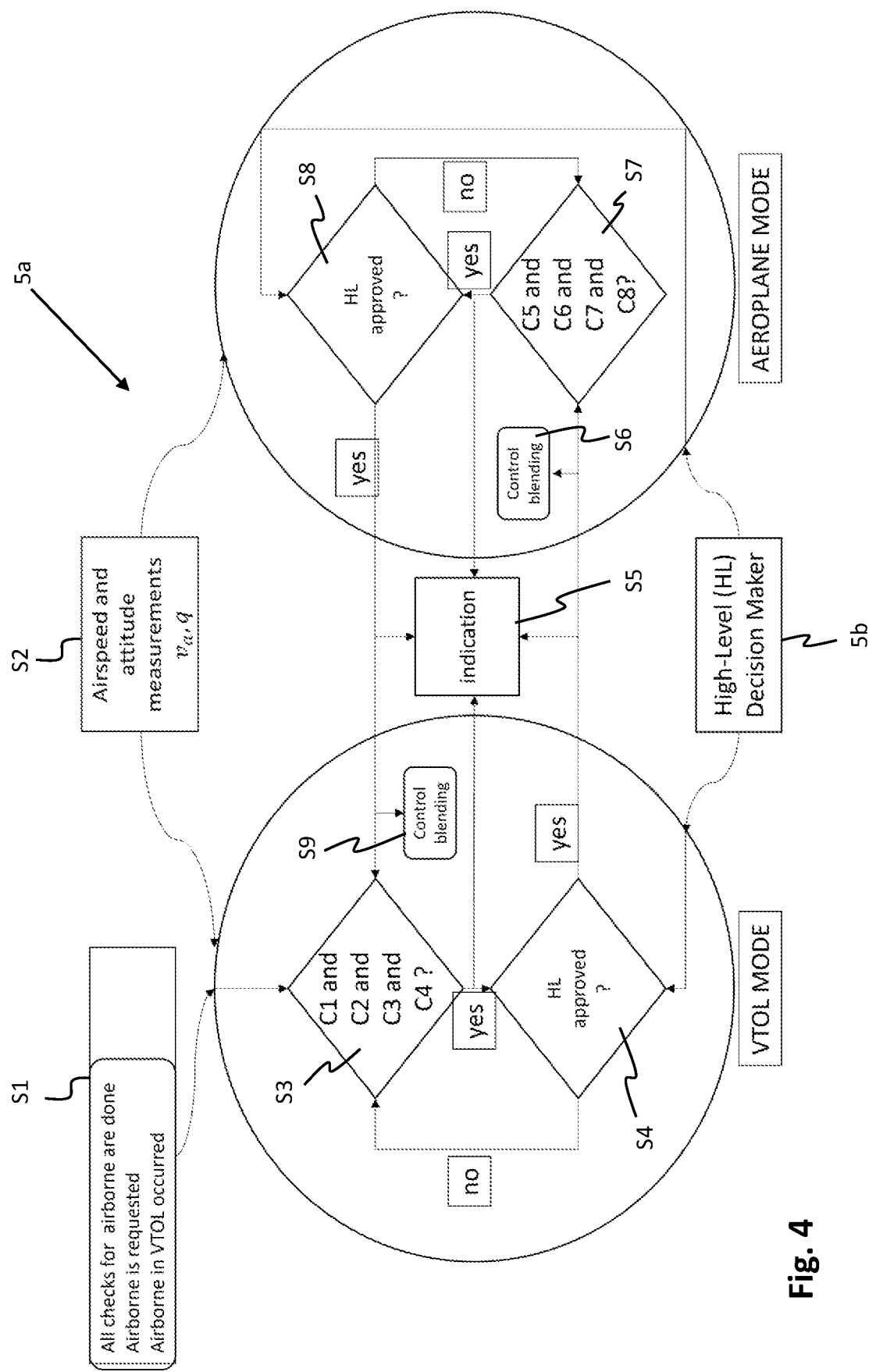
FIG. 4 shows an embodiment of the method according to the invention.

FIG. 4 shows processes within the scope of an embodiment of the method according to the invention. The processes shown take place within the flight control computer 5, which was described above based on FIG. 2.

The two circles in FIG. 4 symbolise two different control regimes, namely a VTOL mode (left) and an Aeroplane mode (right).

The procedure regularly starts in the VTOL mode shown on the left, where in step S1, first all the checks necessary for the take-off of the aircraft have been carried out, then take-off has been commanded, and finally take-off has taken place in the VTOL mode. Thereby, in the procedure according to step S2, the aforementioned sensor measurement data are continuously supplied and thus available.

In step S3 it is checked whether the conditions C1 to C4 explained in detail above are fulfilled. If this is the case ("yes"), a further query is made in step S4 as to whether the high-level decision-maker 5*b* (e.g., human pilot 7, cf. FIG. 2) approves the possible transition to aeroplane mode. If this is the case ("yes"), the transition to aeroplane mode takes place, which will be discussed in more detail in a moment. If not ("no"), the procedure returns to step S3.

If the query in step S4 is answered in the affirmative ("yes"), a corresponding indication is first given in step S5, for example in visual and/or acoustic form to a human pilot on board the aircraft (cf. reference numeral 7 in FIG. 2). Furthermore, in step S6, a gradual fading of the actuator control into the aeroplane mode takes place, as already described in detail above.

The system or the aircraft and its control system is now in the aeroplane mode, cf. the right-hand part of the drawing in FIG. 4. Here, it is first checked in step S7 whether the conditions C5 to C8 explained in detail above are fulfilled. If this is the case ("yes"), a further query is made in step S8 as to whether the high-level decision maker 5*b* (e.g., the human pilot) approves the possible transition to VTOL mode. If this is the case ("yes"), the transition to VTOL mode takes place, which will be discussed in more detail in a moment. If not ("no"), the procedure returns to step S7.

If, on the other hand, the query in step S8 is answered in the affirmative ("yes"), a corresponding indication, for example in visual and/or acoustic form, is first given in step S5, e.g., to a human pilot on board the aircraft. Furthermore, in step S9, a gradual fading of the control back to VTOL mode takes place, as already described in detail above.

Then, the method continues at step S3 and so forth.

As also described above, the decision by the high-level decision maker may be made in particular in response to the indication in step S5, preferably when the high-level decision maker 5b is a human pilot on board the aircraft. However, the invention is by no means limited to such a decision maker 5b—rather, the decision maker 5b may also be an autopilot or artificial intelligence on board the aircraft, or the decision maker 5b (which may again take the form of a human operator or of an artificial intelligence) may be located in the ground station 8, as shown in FIG. 2. In this case, as stated, the decision maker may again be a human operator or an artificial intelligence.

Figure 5:
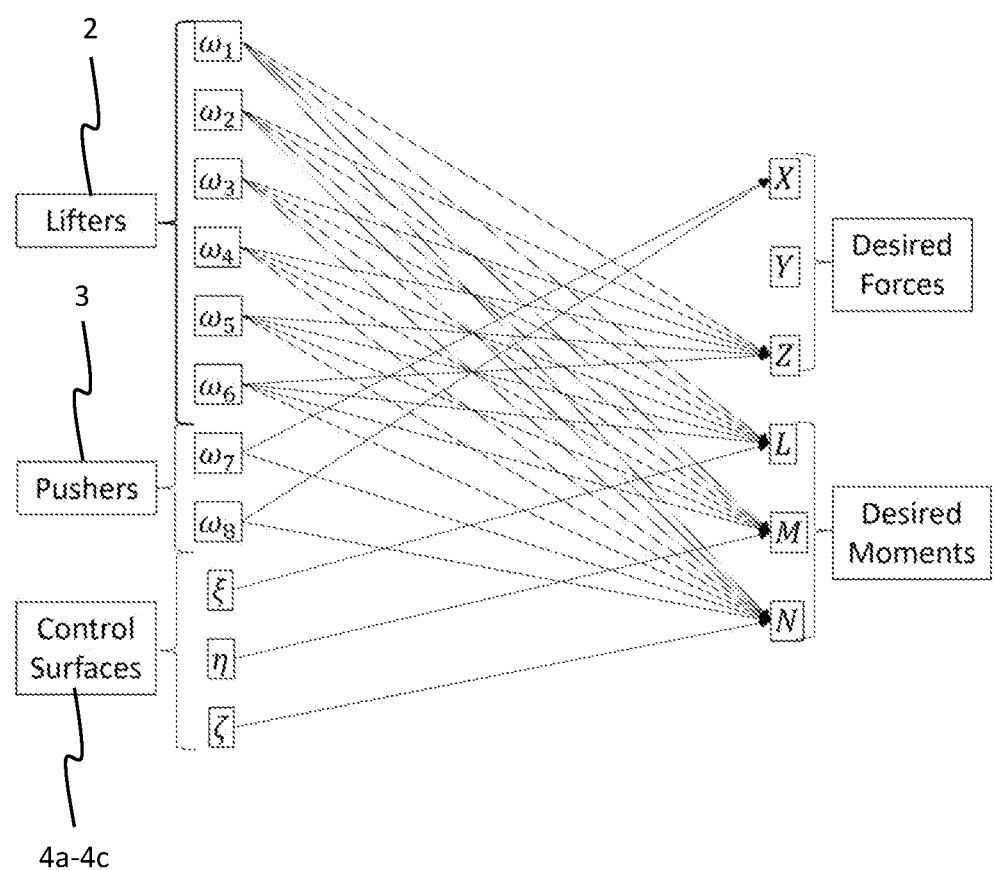
FIG. 5 shows a graphical representation of the relationship between the desired forces and moments on the one hand and the actuator commands on the other hand in an aircraft according to the invention or in a method according to the invention.

FIG. 5 illustrates in graphical form the relationship between the desired forces X, Y, Z and the desired moments L, M, N for controlling the aircraft (right) and the actuators available for generating these forces or moments (left).

The said actuators comprise the six lifting units (compare reference numeral 2 in FIG. 1), identified by their respective rotational speeds $\omega_1$ to $\omega_6$. In addition, there are two forward propulsion units (pushers) (cf. reference numeral 3 in FIG. 1), which are also identified by their respective rotational speeds $\omega_7$, $\omega_8$. Furthermore, there are the control surfaces already mentioned above (cf. reference numerals 4a to 4c in FIG. 1).

The arrows in FIG. 5 indicate which of the said actuators are used or required to generate the respective forces and torques.

FIG. 6 shows a table with possible functions or function types that can be used as filtering functions in various embodiments of the method according to the invention to control blending in and out of the respective controls.

The left column of the table lists the corresponding function names, while the right column of the table shows the corresponding mathematical representations.

The respective function parameters are usually determined empirically or in the course of test flights in order to suitably adapt the functions and thus the blending behaviour of the control.

Figure 7:
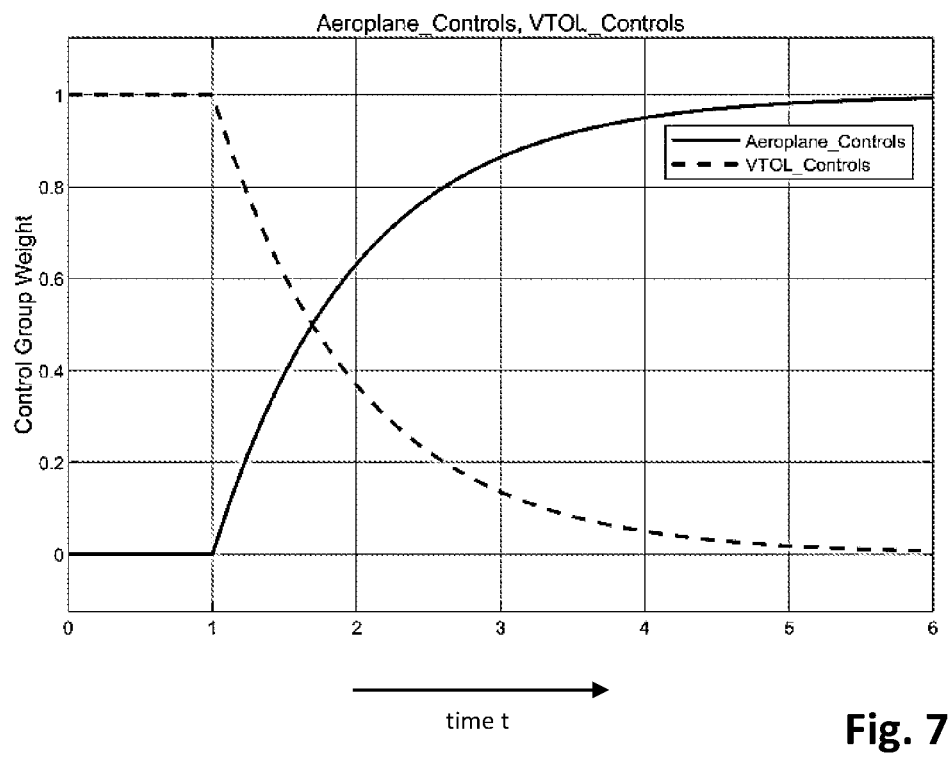
FIG. 7 shows a first possibility of blending two different control regimes.
Figure 8:
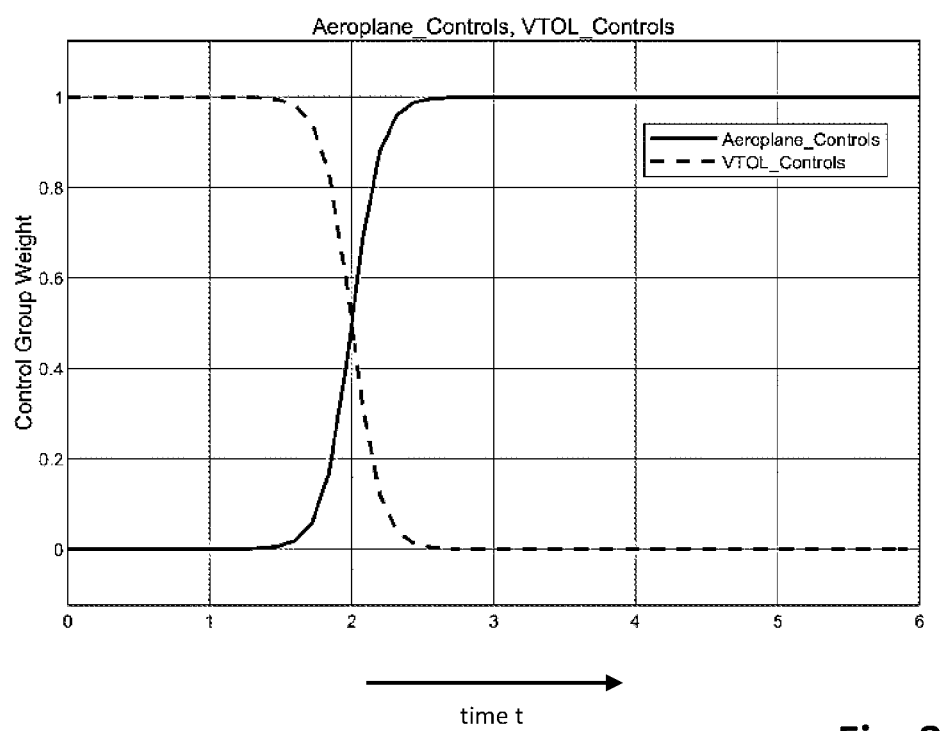
FIG. 8 shows a second possibility of blending two different control regimes.

FIGS. 7 and 8 show the blending of the control regime (weights) for different filtering function types.

FIG. 7 illustrates the transition from VTOL to Aeroplane mode using a single pole low pass filter, and FIG. 8 shows the same state transition using a hyperbolic tangent function.

In both cases, the crossed-out line symbolises the weighting of the control commands for the actuators of the relevant subgroup for the aeroplane mode, which gradually increases over time from the value 0 (in VTOL mode) to the value 1 in aeroplane mode. The weighting of the control commands for the actuators of the other subgroup (for the VTOL mode) correspondingly decreases gradually from the value 1 to become 0, whereby the time-based weighting progressions of the two modes are—without limitation—symmetrical in each case with respect to the median weighting value 0.5.

In the case shown in FIG. 8, the transition between the two modes is significantly faster than in the case of the embodiment according to FIG. 7. In principle, the transitions can be adapted to a particular application with corresponding amendments, in particular by adapting the filtering function types according to FIG. 6.

As stated earlier, blending-in can be done faster, i.e., in shorter time than blending-out, meaning that there is a noticeable difference between the time of blending-in and blending-out, respectively, wherein blending-in is typically quicker. This is however not shown in FIGS. 7 and 8, respectively.

The invention claimed is:

1. A method of controlling a transition aircraft which comprises a plurality of actuators and which is able to transition between a first regime for take-off and landing and a second regime for horizontal flight, and further comprises a state machine that is implemented by at least one flight control computer, the method comprising:
controlling a first subset of actuators from said plurality of actuators in said first regime and a second subset of actuators from said plurality of actuators in said second regime, including:
a) providing, to said flight control computer, measurements or estimates of a number of flight parameters;
b) depending on a current regime from said first and second regimes, checking using said state machine whether a respective predefined set of conditions in connection with said current regime are fulfilled, said conditions are based on a comparison of said flight parameters, with a respective predefined threshold value;
c) if all of the conditions in said predefined set of conditions are fulfilled, signalling a corresponding state of the aircraft to a high-level decision maker and waiting for confirmation regarding a transition from said regime to the other one of said first and second regimes from said high-level decision maker;
d) instructing said flight control computer to make said transition from said current regime to said other one of said first and second regimes if said high-level decision maker has approved the transition;
e) after making the transition in step d), commanding the aircraft according to said other one of said first and second regimes in accordance with a control law implemented on said flight control computer; and
f) returning to step a);
wherein step e) comprises blending in another control law for said other one of said first and second regimes over a first time while blending out the control law for said current regime over a second time, the first time being shorter than the second time.

2. The method of claim 1, wherein said flight parameters comprise at least one of:
a current airspeed (va) of the aircraft, a current attitude (q) of the aircraft, a total collective force (fz) of lifting units of the aircraft, a number of healthy actuators from said plurality of actuators, or, with respect to one said subset of said first and second subsets of actuators, which one said subset corresponds to that one of said first and second regimes which is different from said current regime.

3. The method of claim 1, wherein said actuators comprise lifting units, forward propulsion units and control surface actuators.

4. The method of claim 1, wherein said high-level decision maker is at least one of:
a pilot on board the aircraft, an operator on the ground, an on-board or on-ground artificial intelligence unit.

5. The method of claim 1, wherein said set of conditions comprises at least one of:
an assessment of an attitude (q) of the aircraft in relation to at least one corresponding attitude threshold value, an assessment of an airspeed (va) of the aircraft in relation to at least one corresponding airspeed threshold value, an assessment of a total collective lifting force (fz) of the actuators in relation to at least one corresponding lifting force threshold value, or an assessment of a number of healthy actuators in relation to a number of actuators from said plurality of actuators that are required to achieve stable flight in that one of said first and second regimes which is different from said current regime.

6. The method of claim 1, wherein said transition is made at a moment in flight, in which moment the aircraft is able to achieve stable flight in both said first regime and said second regime.

7. The method of claim 1, wherein said high-level decision maker is enabled to command said transition even if all of the conditions in said predefined set of conditions are not fulfilled.

8. The method of claim 1, wherein said high-level decision maker is forbidden to command said transition even in an absence of all of the conditions in said predefined set of conditions being fulfilled.

9. The method of claim 1, further comprising the flight control computer computing desired pseudo control commands, vdes E Iffi.n, n EN, for the aircraft that are linked to actual actuator commands u E Iffi.m, m EN, via $$v_{des_{n\times1}} = B_{n\times m} \cdot u_{m\times 1},$$

where matrix BE Iffi.nxm is a control effectiveness matrix which contains information on how effective a given one of the actuators is in a direction of the elements of vdes, and via $$U = Bt(WwU,!!) \cdot Vdes,$$

by considering a weight matrix Wu E Iffi.mxm, and physical limits of each said actuator, with upper limits u E Iffi.m and lower limits u E Iffi.m, respectively, where Vi=1, ..., m: 1J:::; ui::; fl, wherein said blending in and out of the control law and the other control law comprises modifying said weight matrix.

10. The method of claim 9, further comprising:

during said first regime, only the actuators from said first subset are used, and these actuators are assigned weight 1 on the weight matrix Ww whereas actuators from said second subset are assigned weight 0;

during said second regime, only the actuators from said second subset are used, and these actuators are assigned weight 1 on the weight matrix Wu, whereas actuators from said first subset are assigned weight 0.

11. The method of claim 10, wherein said second subset comprises control surfaces of the aircraft, and said first subset comprises lifting units of the aircraft.

12. The method of claim 11, wherein the weights in weight matrix Wu that refer to forward propulsion units of the aircraft are always set to 1 in both the first and second regimes.

13. The method of claim 10, further comprising dynamically switching the weights between 0 and 1 by using a mathematical filtering function, $f$, said function being one of: a single pole low pass filter, a double pole low pass filter, a 2nd order low pass Butterworth filter, an algebraic function, a sigmoid function, an arc tangent function, or a logistic function.

14. The method of claim 13, wherein said function is given by $$f(x)=0.5+0.5 \tanh((x-a)/b),$$

with adaptable constant values a and b.

15. The method of claim 13, wherein different blending patterns are used for the transitions from said first regime to said second regime, and vice versa, respectively, using different ones of the filtering functions.

16. The method according to claim 15, wherein the actuators from said first subset of actuators are blended in over the first time and blended out over the second time, said first time being shorter than said second time.

17. The method of claim 15, wherein the blending patterns are predefined for different flight scenarios and are chosen based on states provided by the state machine to flight control algorithms of the flight control computer or are dynamically varied during flight using different respective parametrizations based on various detected or detectable conditions.

18. The method of claim 15, wherein the blending patterns, are further adapted for to achieve at least one secondary objective, including at least one of a minimum power consumption during transition, a minimum time for transition, or a minimum physical load during transition.

19. A transition aircraft, comprising a plurality of actuators and at least one flight control computer, wherein said aircraft is able to transition between a first regime for take-off and landing and a second regime for horizontal flight, and the at least one flight control computer is configured to carry out the method according to claim 1.

20. The transition aircraft of claim 19, wherein the transition aircraft is an electrically powered vertical take-off and landing aircraft, eVTOL.

* * * * *